(No Model.)
N. TESLA.
ELECTRICAL CONDENSER.
No. 567,818.  Patented Sept. 15, 1896.
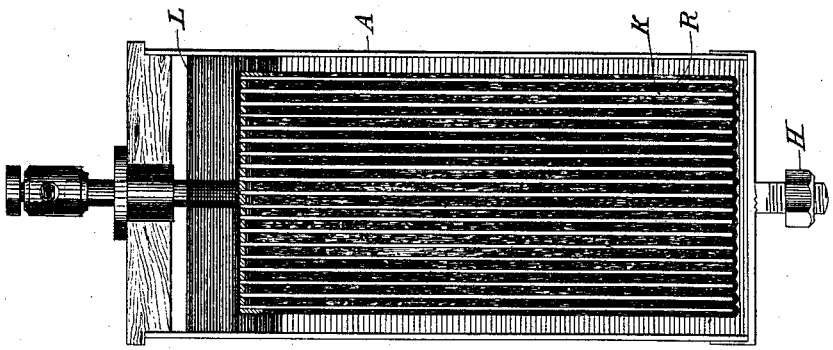
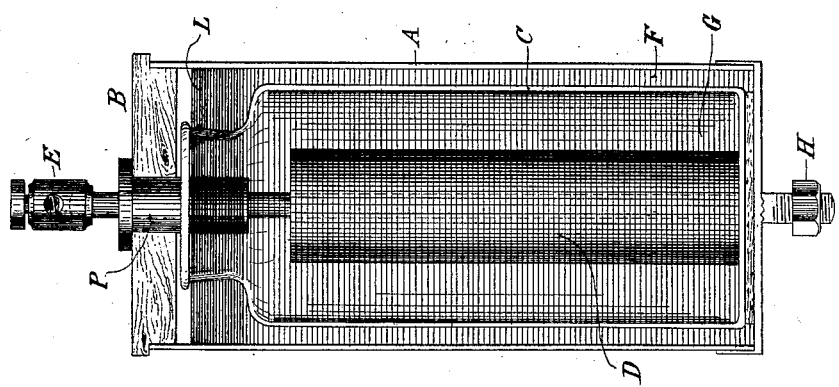
WITNESSES
Raphaël Netter
Drury W. Cooper
INVENTOR
Nikola Tesla
BY
Kerr, Curtis & Page
ATTORNEYS

UNITED STATES PATENT OFFICE.

NIKOLA TESLA, OF NEW YORK, N. Y.

ELECTRICAL CONDENSER.

SPECIFICATION forming part of Letters Patent No. 567,818, dated September 15, 1896.

Application filed June 17, 1896. Serial No. 595,923. (No model.)

*To all whom it may concern:*

Be it known that I, NIKOLA TESLA, a citizen of the United States, residing at New York, in the county and State of New York, have invented certain new and useful Improvements in Electrical Condensers, of which the following is a specification, reference being had to the drawings accompanying and forming a part of the same.

It has heretofore been announced and demonstrated by me that, under ordinary conditions, the efficiency of an electrical condenser is greatly increased by the exclusion of air or gaseous matter in general from the dielectric. In a patent granted to me December 8, 1891, No. 464,667, I have shown and described a convenient and practicable means of accomplishing this result by immersing the conducting-plates or armatures of the condenser in an insulating fluid, such as oil.

My present invention, while based upon this important feature of the practically complete exclusion of air or gas from the dielectric, is an improvement on the forms of condenser heretofore described and used by me.

According to my present invention I employ an electrolyte, or, in general, a conducting liquid in lieu of a solid, as the material for the armatures of the condenser, under conditions more fully hereinafter described, whereby air or gas will be practically prevented from exercising upon the condenser or the more active portions of the same the detrimental effects present in such devices as heretofore made. Such condensers are especially advantageous when used with circuits of great rates of electrical vibration because of the high conducting capacity of such fluids for currents of this character. There is, however, a general advantage derived from the fact that the conducting fluids have a high specific heat, so that the temperature remains constant, a condition in many cases highly advantageous and not met with in condensers of ordinary construction.

In the accompanying drawings, annexed in illustration of the manner in which my improvement is or may be carried into practice, Figure 1 is a view, partly in vertical section, of a condenser constructed in accordance with the invention. Fig. 2 is a part vertical section of a modified form of such condenser.

A designates a jar or receptacle partly or wholly of conducting material and provided with a closely-fitting cap or cover B, preferably of insulating material. Within this receptacle is a smaller jar or vessel C, of insulating material, containing a conducting-electrode D, supported by the cover B, through which passes a suitable terminal E, which may be incased in an insulating-plug P. The spaces within the jars or receptacles are nearly filled with a conducting liquid F G, such as a saline solution, the two bodies of such liquid in the inner and outer receptacles constituting the condenser-armatures. Above the conducting solution in each of the receptacles is poured a layer of oil L or other insulating liquid, which serves to prevent access of air to the highly-charged armatures. The terminals for the two armatures may be provided in various ways, but in such forms of condenser as that illustrated I prefer to utilize the conducting portion of the outer receptacle as one terminal, securing a binding-post to the same, as at H, and to employ an electrode D of suitably-extended surface immersed in the liquid of the inner receptacle and in electrical connection with the binding-post E. It is desirable in some cases to modify the construction of the condenser, as when a larger capacity is required. In such instances, in order to secure the substantial benefits of the improvement above described, I construct the instrument as shown in Fig. 2. In this case I employ a jar or receptacle A which is preferably used also as one terminal and filled with a conducting liquid, as before. Into the latter extends a series of connected conductors K, inclosed and fully insulated from the liquid by a coating of such material as gutta-percha R. These conductors are electrically joined to a terminal E, which extends up through the cover B, and constitute one of the armatures of the condenser. On the surface of the electrolyte or conducting liquid is poured a quantity of oil L, for the purpose above stated. While I have illustrated the invention in its preferred form for general practical purposes, it will be understood that without departure from the invention its construction may be greatly varied and modified.

What I claim is—

1. In an electric condenser constructed or provided with means for the exclusion of air and gas, and an armature composed of a conducting liquid as herein set forth.

2. A condenser comprising as armatures two bodies of conducting liquid electrically insulated and contained in a receptacle from which air and gas are excluded.

3. A condenser comprising two bodies of conducting liquid electrically insulated and contained in a receptacle, and a seal of insulating liquid on the surfaces of the liquid, as set forth.

In testimony whereof I have hereunto set my hand this 15th day of June, 1896.

NIKOLA TESLA.

Witnesses:
DRURY W. COOPER,
M. LAWSON DYER.